Patented Nov. 3, 1942

2,300,420

UNITED STATES PATENT OFFICE 2,300,420

DEWAXING OF WHITE MINERAL OILS

John W. Hassler and Vito C. Lazzaro, Tyrone, Pa., assignors to West Virginia Pulp and Paper Company, New York, N. Y., a corporation of Delaware No Drawing. Application August 31, 1940, Serial No. 355,086

3 Claims. (Cl. 196—17)

Our present invention relates to dewaxing of white hydrocarbon oils especially white medicinal oils, and is based upon our discovery of the selective action of activated carbon for wax-like bodies, including paraffin. Distinction is to be made between white oils which are visibly cloudy, and therefore contain suspended wax, and oils which are entirely clear but which contain dissolved wax. It is to the latter condition that our invention relates.

In the manufacture of white medicinal oils, petroleum of the proper boiling range and viscosity is treated with fuming sulfuric acid or with concentrated sulfuric acid added in several stages. Sludge which forms at the end of each treatment is removed, the acid treatment being carried out under carefully controlled conditions of temperature, agitation, etc. The acid treated oil is neutralized as a rule with aqueous sodium hydroxide solution and sulfonates are extracted from the neutralized oil, using alcohol. Any alcohol remaining in the oil is eliminated by steaming or blowing with filtered air. The oil at this stage is designated as "unfiltered white oil" and is usually percolated through granular fuller's earth or bauxite, which gives a colorless, odorless, tasteless white mineral oil. Other grades are designated as technical white oil, white mineral oil, and white medicinal oil. Medicinal white oils frequently offer the difficulty that upon storage at low temperature the oil becomes cloudy by reason of wax or paraffin which separates out. Frequently cooling for a number of hours is required in order to produce this condition. This property of medicinal white oil is apt to come into question when, as frequently happens, users keep the oil in the refrigerator, or when bottles of the oil become cool during the winter months while reposing on the dealers' shelves or in store windows. Therefore, it is a desideratum that white medicinal oil have what is termed a "cloud point" (the point at which wax precipitation or cloudiness appears) at temperatures usually between 30° to 40° F. The so-called "cloud point" is designated by various testing organizations as A. S. T. M. cloud point, U. S. P. cloud test, refrigerator cloud point, etc. Also there is the cloud point determined by the appearance of wax in the oil on the shelf. The most useful cloud point determination is the so-called refrigerator freezing test, which is the highest temperature at which the oil shows precipitation in wax or cloudiness after refrigeration for a definite period, which is often extended to fifty hours.

It is therefore a principal object of our invention to remove by the use of activated carbon the dissolved wax in white oils to the point where cloudiness is not had upon cooling to the range, say, of between 30° and 40° F. A further object relates to the disposition of the once spent activated carbon. Other objects and advantages will be apparent from the detailed description which follows:

In carrying out our invention it is merely necessary to bring the oil and carbon in intimate mixture for an appropriate length of time, after which the oil is separated from the activated carbon as by filtration; or the oil may be percolated through a column of the activated carbon. Our experiments have indicated that the most efficient range of temperature treatment is between 140° and 160° F., although we do not wish to limit the invention to this precise range as the action of wax removal by the activated carbon occurs both above and below this range; and satisfactory results have been obtained from about 75° F. to about 220° F. Theoretically the maximum wax adsorption should occur as the temperature approaches the point of wax precipitation, but as opposed to this the oil at the lower temperatures has a higher viscosity which retards the penetration of the oil into the pores of the activated carbon. If a mixture of oil and activated carbon be used, desirably the mixture is agitated by mechanical means for a period of time ranging from a few minutes to several hours, following which the activated carbon is separated from the white oil by suitable means. At the preferred temperature range of from 140° to 150° F. a contact period of at least one hour is indicated, with longer periods for temperatures outside this range.

Alternatively, the oil may be percolated through a column of the carbon.

The determination of the proper quantity of adsorbent carbon for use in the process will depend upon several factors such as the amount of wax in the oil, the cloud point temperature to be arrived at, as well as the amount of taste, odor and impurities such as sulfonates which are to be removed. In such case the amount of carbon will depend upon which of the requirements mentioned is the most difficult to meet. Usually, however, the amount of carbon required to effect a substantial lowering of the refrigerator cloud point will accomplish the removal of the other bodies mentioned.

*Example 1*

234 gallons heavy viscosity white oil was mixed with 12½% (219 pounds) of activated carbon of the type known commercially as Nuchar C. P. F. at a temperature of 150° F. for sixty minutes, and then filtered. The treatment was repeated with the same quantity of fresh activated carbon. White mineral oil was obtained which is wax-free at 27° F. Since the activated carbon is still active for purposes other than the removal of wax, the same may be utilized in accordance with the following:

1230 gallons of medium viscosity white oil was treated with 438 pounds (4.75%) once spent activated carbon obtained from the foregoing. Tasteless white medicinal oil was obtained, with no treating loss.

2900 gallons technical white oil was treated with 2% (438 pounds) twice spent activated carbon from the preceding step. Tasteless and odorless technical white oil was obtained, with no treating losses.

The thrice spent activated carbon was extracted with naphtha to remove retained oil and dried to remove naphtha, and used to treat 14,600 pounds unfiltered paraffin wax, the amount of carbon being 3% of the wax. Tasteless paraffin wax was obtained.

In most instances it is not necessary to remove all the wax in the oil, in which case a less quantity of activated carbon may be used.

*Example 2*

6,000 gallons of unfiltered heavy (350 viscosity at 100° F.) white oil (45,000 pounds) was treated with 3% of an activated carbon sold commercially under the designation "Nuchar" C–115 (1350 pounds activated carbon) and agitated mechanically for one hour at 140° to 150° F. following which the mixture was filtered through a Sweetland press under 50 pounds per sq. inch pressure. At the end of the filtration the press was blown with air to recover loosely held oil on the carbon. This treatment reduced the refrigerator cloud point from 45° to 36° F. It also rendered the white oil practically colorless, odorless and tasteless, which was made completely so by treatment with 18% of fuller's earth.

A further beneficial effect by our improved treatment of white mineral oil is the greater viscosity of the dewaxed oil for the reason that dissolved paraffin decreases the viscosity of the oil.

As to the choice of activated carbon, some grades of carbon are found to be of greater potency than others; and, moreover, the power of wax adsorption is often unrelated to other properties of the activated carbon. For example, activated carbon which has a high so called molasses value, i. e., which is highly efficient for removing color bodies therefrom, does not necessarily have a high wax adsorption value. On the other hand, activated carbon which possesses good wax adsorption properties can be recovered, as given above, by extraction with naphtha and reactivation. Because of the presence of the impurities which are later carbonized, substantially no loss of carbon results, and the revivified activated carbon has substantially the efficiency of the original material.

A further advantage is that the activated carbon removes the sulfonates from the oil. Activated carbon is of particular utility for white mineral oils, since when colored oils are treated most of the adsorptive power of the carbon goes to removing the color, leaving little of the power for removing the wax. It will also be found that some oils are more easily treated for wax removal than others. Thus, neutral oil derived from Texas coastal crude is more easily treated for wax removal by activated carbon than the same type of oil derived from Pennsylvania crudes.

We claim:

1. The process of removing dissolved wax in white mineral oils, which comprises subjecting the oil to the action of activated carbon having affinity for said wax at a temperature not greatly in excess of 225° F., and removing the carbon from the oil.

2. The method according to claim 1, in which the treatment is carried out at a temperature between 140° and 160° F.

3. The method which consists in treating white mineral oil with activated carbon to remove dissolved wax therefrom, said carbon having affinity for said wax, and thereafter utilizing the once spent activated carbon for removal of color bodies from mineral oil.

JOHN W. HASSLER.
VITO C. LAZZARO.